Figure 1:
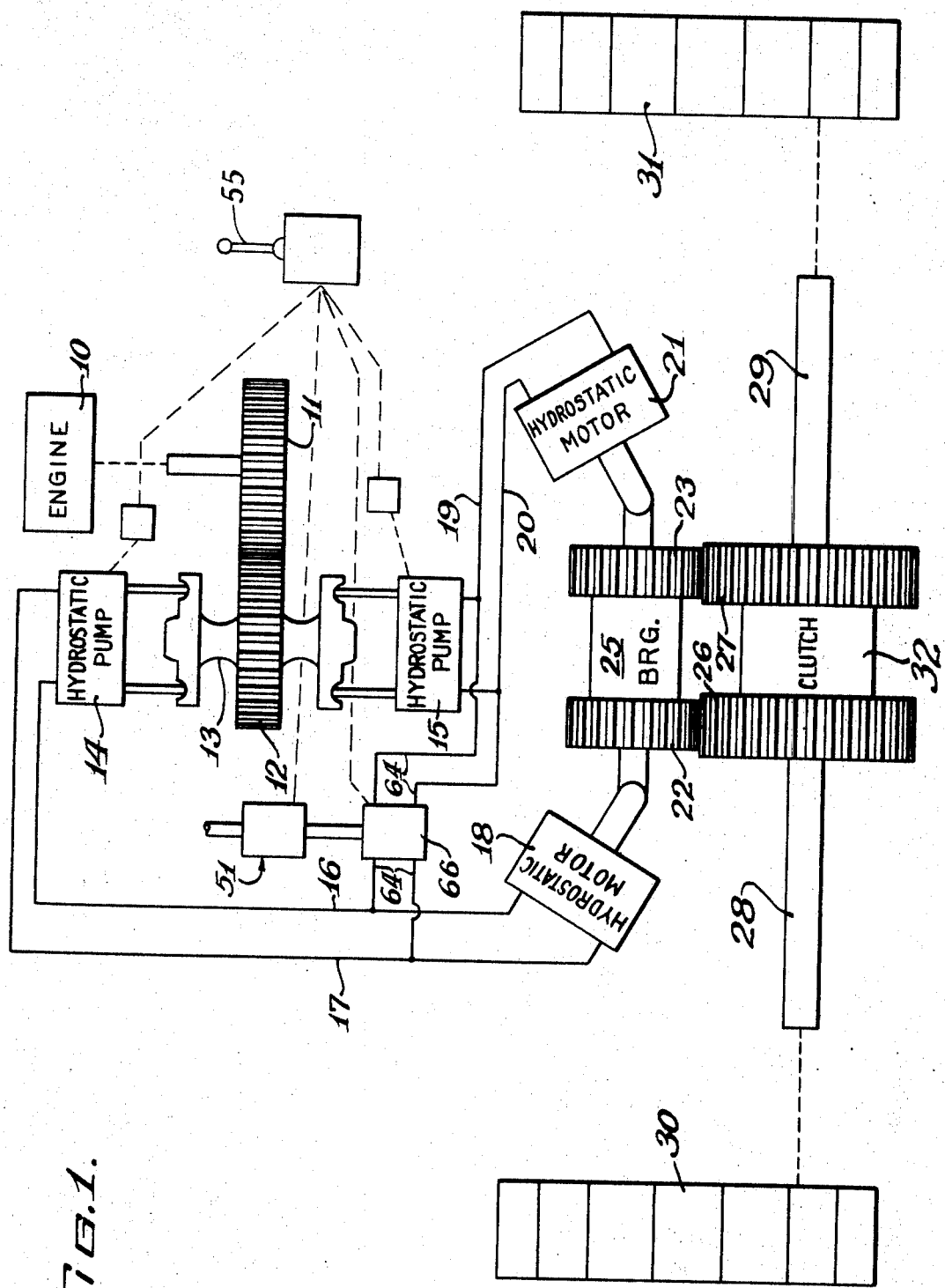

United States Patent [19]
Swift

[11] 3,744,584
[45] July 10, 1973

[54] HYDROSTATIC TRANSMISSION MOTORS AND COORDINATING CLUTCH FOR SAME

[75] Inventor: John F. Swift, Chicago, Ill.

[73] Assignee: International Harvester Company, Chicago, Ill.

[22] Filed: Apr. 29, 1971

[21] Appl. No.: 138,511

[52] U.S. Cl............................ 180/6.48, 192/91 A
[51] Int. Cl.......................................... B62d 11/04
[58] Field of Search........................ 180/6.48, 6.3; 60/53 A, 97 E; 192/91 A

[56] References Cited
UNITED STATES PATENTS
| | | | |
|---|---|---|---|
| 2,996,135 | 8/1961 | Grabow | 60/53 A |
| 3,145,816 | 8/1964 | De Lorean | 192/91 A |
| 3,612,199 | 10/1971 | Vissers | 180/6.48 |
| 2,126,255 | 8/1938 | Hacker | 180/6.48 |

FOREIGN PATENTS OR APPLICATIONS
1,195,613  6/1965  Germany................... 180/6.48

Primary Examiner—Benjamin Hersh
Assistant Examiner—John A. Pekar
Attorney—Floyd B. Harman

[57] ABSTRACT

Clutch for interconnecting tracks at two sides of a crawler tractor driven by separate hydrostatic motors. The tracks are driven at the same speed to move the tractor in a straight line. The clutch connects the two sides of the tractor drive, assuring drive at the same speed. Drive for each side comprises a rotatable input member, a hydrostatic pump driven thereby, a hydrostatic motor driven by the pump, and a rotatable output member driven by the motor. The clutch is between the rotatable output members of the two sides of the drive and is engaged for positive inter-connection of the two output members.

5 Claims, 2 Drawing Figures

HYDROSTATIC TRANSMISSION MOTORS AND COORDINATING CLUTCH FOR SAME

The present invention relates to a coordinated hydrostatic two-path drive for tractors. More specifically, the invention relates to a clutch for interconnecting tracks at the two sides of a tractor driven by hydrostatic motors.

It is well known in the operation of a track type tractor including two separate hydrostatic motors to drive the endless tracks at different speeds for turning and to drive the tracks at the same speed for straight line movement of the tractor. The tractor hydrostatic motors are supplied by output from respective angleable hydrostatic pumps to which the hydrostatic motors are connected, and the pump angles are varied for variation in the speed of the hydrostatic motors. It might be expected that identical control of the pump angle of the hydrostatic pumps for the hydrostatic motors on the two sides of the tractor would produce the same speed in the two sides and thus straight-line movement of the tractor. Unfortunately, however, drifting of the tractor away from the desired straight-line movement is hard to avoid.

An object of the present invention is to achieve straight-line movement of a tractor whose tracks at opposite sides are separately driven by hydrostatic motors.

Another object is the provision of a two-track tractor having a final drive provided with motor outputs individual to the two tracks, and having a friction clutch to frictionally lock the two outputs for effecting equal track speed and straight line steering of the tractor.

Another object, in line with the foregoing objective of providing a two-track tractor with motor outputs individual to the two tracks, is the provision with or without the friction locking clutch of motor service lines having equalizer lines therebetween. The equalizer lines are controlled by a steering control to insure equal working pressure on the motors when the tractor movement is straight line or approximately so.

Figure 2:
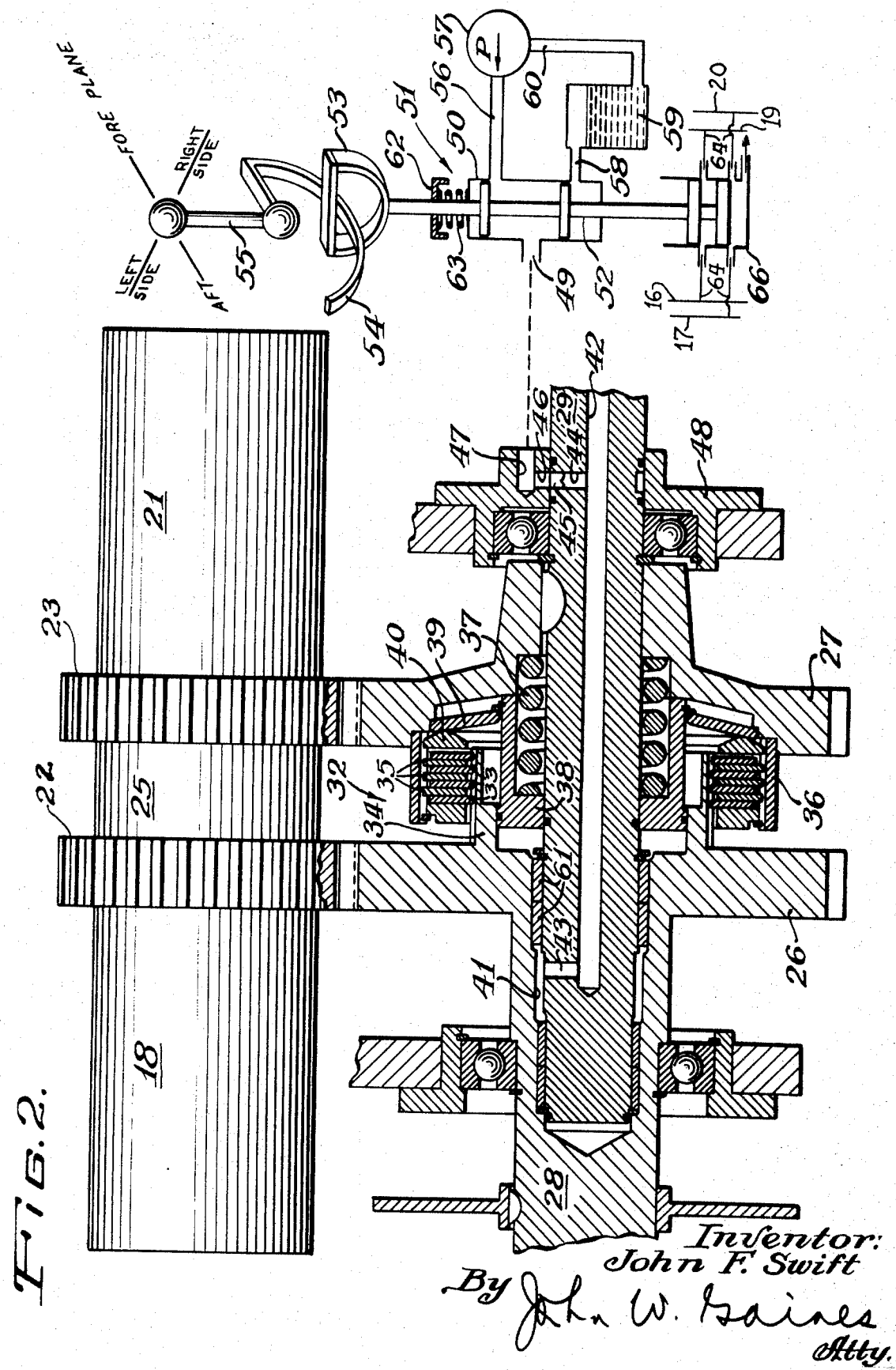

Other objects will appear from the specific description that follows taken in conjunction with the attached drawings, in which:

FIG. 1 is a diagrammatic view of a drive for a crawler tractor embodying the present invention; and FIG. 2 is a fragmentary sectional view of the tractor drive, including a clutch applied in a novel way thereto.

As shown in FIG. 1, a tractor engine 10 drives a gear 11, which meshes with a gear 12 forming part of a single rotatable driving member 13. One end of the driving member 13 drives a hydrostatic pump 14, and the other end, a hydrostatic pump 15. The driving member 13 is functionally associated with the hydrostatic pumps 14 and 15 so that they have zero output when an operator-operated steering and drive control lever means aligns them with the driving member 13, and have an output increasing as their angle with respect to the driving member 13 is increased by the operator-operated means. The hydrostatic pump 14 is connected by the usual two-way service lines 16 and 17 with a hydrostatic motor 18 to drive the same, and the hydrostatic pump 15 is connected by lines 19 and 20 with a hydrostatic motor 21 to drive the same. The motors 18 and 21 are back-to-back to one another and are drivingly coupled to two input gears 22 and 23, respectively. The gears 22 and 23 are relatively close to one another and a rotary thrust bearing 25 positioned between and in contact with them arranges for the hydrostatic motors 18 and 21 to react their axial thrust against one another in a mutually balancing relation. The dynamic bearing load is much reduced in the back-to-back arrangement. The input gears 22 and 23 respectively, mesh with rotatable output gears 26 and 27, which are drivingly connected with and coaxially mounted on the inner adjacent ends of output shafts 28 and 29, respectively. The outer ends of shafts 28 and 29 are connected by means (not shown) with endless tracks 30 and 31, respectively, of connected track links, which engage the ground for driving the tractor.

As shown in FIG. 2, a clutch 32 is located between the output gears 26, in axial alignment with the latter and with the oppositely extending shafts 28 and 29. The clutch 32 is a stacked plate clutch including a set of alternate disks 33 keyed to the exterior of a hub-like extension 34 on the output gear 26 and another set of alternate disks 35 keyed to the interior of a ring 36 secured to the output gear 27. The disks 33 and 35 are held in a gripping engagement with one another during operation of the clutch 32. The clutch is so operated on a spring-engaged principle, by means of a coil spring 37 acting in a leftward direction, as viewed in FIG. 2, through a piston 38, a conical disk spring 39, and a pressure plate ring 40. One end of the coil spring 37 acts against the piston 38, and the other end, against the output gear 27 so as to bias the pressure plate 40 from the solid line position as shown in FIG. 2 to a disk-compressing position to the left, not shown. The piston 38 is annular and slidingly engages the output shaft 28 and the interior of the hub-like extension 34 on gear 26. The output gear 26 is formed integral with the output shaft 28, and so the hub-like extension 34 formed on the gear 26 is also a part of the shaft 28.

The clutch 32 is disengaged by rightward displacement of the piston 38 into the solid line position as shown in FIG. 2, brought about by hydraulic fluid. To this end, the output shaft 28 has a blind axial bore 41 which extends from the end at which the output gear 26 is located and receives the end of the output shaft 29. The shaft 29 has an axial passage 42 having an end located in the part of the shaft within the blind bore 41 of the output shaft 28, and from this end extends one or more radial passages 43.

At a region beyond the output gear 27 the output shaft 29 has one or more radial passages 44 extending from the axial passage 42 to a peripheral groove 45 in the shaft 29. The groove 45 registers with a radial opening 46 connected with a longitudinal opening 47, both formed in a stationary member 48. The opening 47 is connected by a line (not shown) with a side opening 49 in a stationary part 50 of a valve 51. The valve 51 also has a movable part 52, an end of which is external to the stationary part 50 and is attached to a stirrup 53 receiving an arcuate member 54 forming part of a universally mounted, operator-operated steering and drive control lever 55.

The stationary part 50 of the valve 51 is connected by a line 56 with the outlet side of a pump 57 and by a line 58 with a tank 59 leading to a line 60 to the inlet side of the pump.

The lever 55 is schematically shown as a Joyce stick. In actual practice, the steering control means can comprise left and right steering levers, for example, and in any case such means controls the motor speeds individually by separate angling connections to their respective pumps 14 and 15.

When the movable part 52 of the valve 51 is so positioned as to connect the pump outlet line 56 with the opening 49 as shown in FIG. 2, hydraulic fluid is supplied through openings 47 and 46, groove 45, radial passages 44, axial passage 42, and radial passages 43 to the bore 41 in the output shaft 28. From there, the hydraulic fluid passes between circumferentially-spaced elements of a set of bearings 61 and between the shafts 28 and 29 to the piston 38, displacing it to the right as viewed in FIG. 2.

Movement of the lever 55 forwardly of a transverse reference plane defined by the indicia "left side" and "right side" appearing in FIG. 2 causes both motors or a selected one to drive the tractor ahead. Movement displacing the lever rearwardly of the reference plane causes the tractor to drive rearwardly, at speeds proportionate to the amount of displacement of the lever from the plane.

When the movable valve part 52 is shifted, from the position of FIG. 2, to a downward position to connect opening 49 in stationary body 50 with line 58, hydraulic fluid drains from the space between the piston 38 and the output gear 26 back through the passages in the output shaft 29 to the tank 59. The spring 37 is strong enough to return the piston 38 downwardly from the position of FIG. 2 and to reverse the conical disk spring 39, whereupon the clutch 32 is re-engaged.

When the tractor is to be pivoted about one track or to be moved along a curved line, the endless tracks or loops 30 and 31 will be operated at different speeds or a selected endless loop will be held against movement. Such operation will involve movement of the drive control lever 55 toward the referred to indicia "left side" and "right side" in one direction or the other. When this happens, the arcuate member 54 will act through the stirrup 53 to position the movable valve part 52 so that the pump outlet line 56 is connected with the opening 49. In other words, the lever 55 when out of the longitudinal vertical plane causes fluid pressure to be applied to release the clutch.

Thus, hydraulic fluid is supplied to the clutch 32 to disengage it, with the result that the input gears 22 and 23 can be driven at different speeds by the hydrostatic motors 18 and 21, respectively, while the clutch is disengaged.

In the event the tractor is to be moved in a straight line, the steering and drive control lever 55 is moved as desired in the plane of the axis of the movable valve part 52 toward and away from the indicia "aft" and "fore plane." In this event, the movable valve part 52, as positioned by a spring 63 acting between the end of the stationary part 50 and a collar 62 fixed to the movable valve part 52, connects the opening 49 in the stationary valve part 50 with the drain line 58, as shown in FIG. 2. Thus, hydraulic fluid is drained away from the piston 38, which is returned to the position of FIG. 2 by the spring 37. The clutch 32 becomes engaged, and the output shafts 28 and 29 are compelled to rotate at the same speed because of coupling of the output gears 26 and 27 by the engaged clutch 32.

The movement of the lever 55 in the aft and fore plane as just described will tend to produce identical operation of the hydrostatic motors 18 and 21 on the input gears 22 and 23, with resultant tendency of these gears to rotate at the same speeds.

Any variation of the speed of one gear from that of the other due to the sensitivity of the hydrostatic motors 18 and 21, will be immaterial, for engagement of the clutch 32 positively assures rotation of the output shafts 28 and 29 at the same speed. This, of course, means that the tracks or loops 30 and 31 will move at the same speed, and the tractor will move in a straight line. Pressure equalizer lines 64 (FIG. 1) are therefore provided to interconnect the service lines 16, 17, 19, and 20. A valve 66 mechanically in tandem with the clutch valve 51 controls the interconnection so that, irrespective of their direction of rotation, the motors 18 and 21 have the same inlet pressure and the same outlet pressure at all times and only those times when the clutch 32 remains engaged. More specifically, the valve 66 is appropriately moved by the lever 55 to interconnect those two lines which are acting as flow lines and to interconnect those two lines which are acting as return lines, among the respective service lines 16, 17, 19, and 20.

What is claimed is:

1. In a crawler tractor in which two endless loops of connected track links are separately driven by two output shafts extending in opposite directions from two closely positioned output gears, the output gears are driven by two input gears meshing therewith, the input gears are driven by two hydrostatic motors by virtue of the angles between the axes of the motors and those of the input gears, two hydrostatic pumps drive the two hydrostatic motors, and a single rotating driving part drives the hydrostatic pumps by virtue of angles between the axis of the driving part and those of the pumps: the combination with the output gears and the output shafts, of a clutch positioned between the output gears and having one side connected to one output shaft and the other side connected to the other output shaft, the clutch when disengaged providing for the output gears and output shafts to drive the loops of track links independently at different speeds for turning of the tractor, engagement of the clutch producing coupling of the output shafts to one another through the output gears and thus positively to assure driving of the loops of track links at the same speed for straight line motion of the tractor, in spite of the tendency of the hydrostatic motors to drive the input gears and loops at slightly different speeds even though set to drive them at the same speeds;

said one output shaft having an axial recess extending from the end where the associated output gear is located, said other output shaft projecting into the axial recess in the said one output shaft and having longitudinal passage means, said passage means arranged with respect to the other output shaft to transmit hydraulic fluid therethrough, and substantially coaxial therewith, an annular piston surrounding and being surrounded by said one output shaft and said other output shaft, respectively, springs acting against the piston to retract it and engage the clutch, and means for supplying hydraulic fluid through the passage means in the said other output shaft to displace the piston against the springs for disengaging the clutch.

2. In a track type tractor having a two-path hydrostatic transmission in the final drive of the tractor:

a pair of relatively rotatable oppositely extending output shafts;

back-to-back hydrostatic motors individual to the shafts to apply power thereto;

individual pumps with service lines transmitting pressure fluid and making separate connections to each motor for delivering the power to turn the shafts under approximately the same or else asynchronous speed conditions;

pressure equalizer valve means effective between service lines during the same speed condition to insure the same working pressure in both motors;

clutch means operatively disposed between the shafts and effective upon clutching to insure identical speeds thereof; and means common to the equalizer and clutch means to cause the clutching and pressure equalization to be effected in unison and to be interrupted in unison.

3. In a track type tractor having a two path hydrostatic transmission in the final drive of the tractor, controllable for steering purposes:

back-to-back, mutually spaced apart hydrostatic motors having side-by-side pinions driven thereby;

side-by-side, mutually spaced apart gears meshing with the pinions;

thrust bearing means in the space between and operatively interconnecting the motors to balance the thrust;

a pair of relatively rotatable oppositely extending output shafts secured at the inner end to the respective gears;

means in the space between the gears, mutually axially aligned both with the shafts and with the gears and effective therewith for operatively coupling same together to establish the same-speed condition for the shafts;

pumps with service lines transmitting pressure fluid and making separate connections to each motor for delivering the power to turn the shafts under approximately the same, or else asynchronous speed conditions for the steering purposes described;

pressure equalization means effective between service lines during the same-speed condition to insure the same working pressure in both motors; and means operative to cause the coupling and pressure equalization to be effected, and to be interrupted.

4. The invention of claim 3, said coupling means characterized by friction clutch means operative between the shafts upon clutching to insure identical speeds thereof;

said operative means characterized by a steering control effective to cause the coupling (clutching) and pressure equalization in unison and the interruption thereof in unison.

5. In a track type tractor having a two path hydrostatic transmission in the final drive of the tractor and controllable by steering control means:

a pair of relatively rotatable oppositely extending output shafts;

back-to-back hydrostatic motors individual to the shafts to apply power thereto;

pumps with service lines transmitting pressure fluid and making separate connections to each motor for delivering the power to turn the shafts under approximately the same or else a synchronous speed conditions;

pressure equalizer means effective between service lines during the same speed condition to insure the same working pressure in both motors; and clutch means operatively disposed between the shafts and effective upon clutching to insure identical speeds thereof;

said pumps comprising variable speed individual pump means provided with and responsive to steering control means positionable to cause the motors to steer the tractor by driving or, when clutching and pressure equalization are effective in unison, to cause straight line movement of the tractor;

the equalizer means being controlled by said steering control means, and the clutch means being controlled by said steering control means and a spring so as to be engaged when the steering control means is in the position for straight movement, whereby the pressure equalization and clutching are automatically effected in unison and automatically interrupted in unison as dictated by the condition of the steering control means.

* * * * *